(12) United States Patent
Lee et al.

(10) Patent No.: US 7,092,555 B2
(45) Date of Patent: Aug. 15, 2006

(54) SYSTEM FOR REGISTERING AND AUTHENTICATING HUMAN FACE USING SUPPORT VECTOR MACHINES AND METHOD THEREOF

(75) Inventors: Kyunghee Lee, Daejeon (KR); Yongwha Chung, Daejeon (KR); Chee Hang Park, Daejeon (KR); Hyeran Byun, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 745 days.

(21) Appl. No.: 10/147,973

(22) Filed: May 20, 2002

(65) Prior Publication Data

US 2003/0103652 A1 Jun. 5, 2003

(30) Foreign Application Priority Data

Dec. 5, 2001 (KR) ............................... 2001-76638

(51) Int. Cl.
*G06K 9/00* (2006.01)
(52) U.S. Cl. ...................................................... 382/118
(58) Field of Classification Search ................. 340/5.3
See application file for complete search history.

(56) References Cited

U.S. PATENT DOCUMENTS

| | | | | |
|---|---|---|---|---|
| 5,978,507 | A * | 11/1999 | Shackleton et al. | 382/195 |
| 5,987,155 | A * | 11/1999 | Dunn et al. | 382/116 |
| 6,655,585 | B1 * | 12/2003 | Shinn | 235/382 |
| 6,671,391 | B1 * | 12/2003 | Zhang et al. | 382/118 |
| 6,807,286 | B1 * | 10/2004 | Krumm et al. | 382/103 |
| 6,885,760 | B1 * | 4/2005 | Yamada et al. | 382/118 |
| 2003/0103647 | A1 * | 6/2003 | Rui et al. | 382/103 |
| 2004/0028273 | A1 * | 2/2004 | Hamahashi et al. | 382/173 |

FOREIGN PATENT DOCUMENTS

KR 0130013 4/2001

OTHER PUBLICATIONS

Guodong Guo, Stan Z. Li and Kapluk Chan, School of Electrical and Electronic Engineering, Nanyang Technological University, "Face Recognition by Support Vector Machines", Proc. of IEEE Int'l Conference on Automatic Face and Gesture Recognition, 2000, pp. 196-201.
P. Jonathon Phillips, National Institue of Standards and Technology, "Support Vector Machines Applied to Face Recognition", Advances in Neural Information Processing Systems 11, 1999, pp. 803-809.

* cited by examiner

*Primary Examiner*—Jingge Wu
*Assistant Examiner*—Robert Tarcu
(74) *Attorney, Agent, or Firm*—Mayer, Brown, Rowe and Maw LLP (57) ABSTRACT

A system for performing face registration and authentication using face information, and a method thereof. A set of readily distinguishable features for each user is selected at a registration step and only the set of features selected at the registration step is used at a face authentication step, whereby memory use according to unnecessary information and amount of data calculation for face authentication can be reduced. Thus, the present system has an advantage in that identity authentication through face authentication can be performed even under restricted environments of a USB token or smart card with limited resources. The present system further has advantages in that authentication performance is improved, as readily distinguishable feature information is used, and the time for face authentication is reduced, as face authentication is performed using the SVM built by using the optimal set of readily distinguishable features at a training step.

24 Claims, 9 Drawing Sheets

SYSTEM FOR REGISTERING AND AUTHENTICATING HUMAN FACE USING SUPPORT VECTOR MACHINES AND METHOD THEREOF

FIELD OF THE INVENTION

The present invention relates to an identity authentication system; and, more particularly, to a system for registering/authenticating a human face even in restricted environments and a method thereof.

BACKGROUND OF THE INVENTION

As well known to those skilled in the art, an identity authentication system is used to restrict an access to a certain region or building, which needs security, to only previously registered persons. Among identity authentication systems, a smart card system is widely used, wherein various personal information of a user and PIN number for gaining an access to a certain building are stored in a smart card so that the access is given to the user only when the personal information and PIN number in the card are matched to those previously registered. However, the smart card system has a disadvantage in that a surreptitious use, counterfeiting and altering of the card by another person are relatively easy.

In recent days, interest is directed to a technological field of biometric identification using unique biometric information of a user such as a retina, iris, fingerprint, signature, voice or face for identity authentication, because of its superior security. Since security is a main concern of society, users require more reliable security systems. Thus, a security system using biometric identification shows significant increase in use in spite of its high establishment cost.

A conventional biometric information authentication system using the fingerprint, retina, iris, signature or etc. has a problem of causing inconvenience to a user upon entering biometric information, wherein the system forces the user to perform a certain behavior such as personally entering fingerprint information in a fingerprint recognition device or placing eyes very close to a iris recognition device. When face information among above biometric information is used, inconvenience or discomfort that the user experiences upon entering biometric information is much reduced, which is advantageous. Therefore, researches and studies into identity authentication technology using face identification have been actively conducted.

The researches and studies into the face identification can be conventionally classified into a holistic approach and an analytic approach.

The holistic approach represents a universe characteristic of face image domain by using a set of orthonormal basis vectors. One now widely used among the basis vectors is an eigenface. The eigenface is derived from the covariance analysis of the face image population. If two faces are sufficiently identical to each other in an eigenface feature space, they are regarded as the same. For example, a template matching-based face recognition system employs such holistic approach. The holistic approach considers all parts of a pattern, uses information of a whole image, thereby causing a problem of slow data processing.

The analytic approach extracts such facial attributes as nose and eyes from the face image and uses the invariance of geometric properties among the face landmark features, to thereby recognize the features of a face. This approach requires high recognition speed and low-memory, while the selection and extraction of features are difficult.

Recently, among the researches and studies into the face identification, a research and study using SVMs (Support Vector Machines) capable of performing a fine classification function has been actively conducted. The face identification usually applies the SVMs to information of whole face image, whereby the SVMs has to store SVs (Support Vectors) of high dimensions in order to store an OSH (Optimal Separating Hyperplane). This causes a problem in the SVMs themselves, that a large memory is required. Therefore, the face identification has a problem that it is hard to use in restricted environments, such as those with a limited memory and capability of calculation.

SUMMARY OF THE INVENTION

In accordance with a preferred embodiment of one aspect of the present invention, there is provided a face registration system for face authentication using a SVM, including: an image input unit for inputting face images of users to be registered in the registration system; a face and eye region extraction unit for extracting face and eye regions from each face image inputted to the image input unit; a control unit for classifying the face images of users into training and tuning face images and forming a set of features representing chromosomes of each face image of training and tuning images; and a SVM classifier for iteratively measuring fitness value of the set of features of each chromosome of the training image using GA (Genetic Algorithms) to select the set of features most suitable to be a feature vector of a corresponding user requesting face authentication and extracting a feature vector from the face image of other users corresponding to the selected set of features, thereby comparing two vectors to determine a result of face authentication.

In accordance with another preferred embodiment of one aspect of the present invention, there is provided a face authentication system using a SVM, including: an image input unit for inputting face images of users to be authenticated in the authentication system; a face and eye region extraction unit for extracting face and eye regions from each image inputted to the image input unit; a personal information input unit for inputting personal identification information of a specific user registered in the authentication system to perform face authentication upon receiving a request for identity authentication by the user; a control unit for reading support vectors, weights and a selected set of readily distinguishable features of the user previously stored, corresponding to personal identification information for face authentication of the user inputted to the personal information input unit, and extracting feature values from the face image inputted to the image input unit corresponding to the set of readily distinguishable features previously stored; and a SVM classifier for using the support vectors and weights to build the SVM and using an input vector of the feature values extracted from the face image, thereby performing face authentication using the SVM.

In accordance with still another preferred embodiment of one aspect of the present invention, there is provided a face authentication system using a SVM, including: an image input unit for inputting face images of users to be authenticated in the authentication system; a face and eye region extraction unit for extracting face and eye regions from each image inputted to the image input unit; a smart card internally having a SVM classifier and to build the SVM using support vectors and weights previously stored for face authentication of the user and receive feature values extracted from a face image of a user requesting identity authentication as an input vector, thereby performing face authentication; an identification recognition unit for interfacing transmitted/received data between the smart card and authentication system; and a control unit for inputting values of a set of readily distinguishable features of the user from the smart card, and extracting feature values from the face image of the user corresponding to the set of readily distinguishable features previously stored, thereby transferring an input vector of the extracted feature values to the smart card, thereby requesting face authentication.

In accordance with a preferred embodiment of another aspect of the present invention, there is provided a method for face registration by a face registration system using a SVM, including the steps of: (a) inputting face images of users registered in the registration system; (b) extracting face and eye regions from each inputted image; (c) calculating feature values corresponding to whole sets of features to be used to select features from the inputted image; and (d) forming a set of features representing each chromosome of the face image and using the set of features having highest fitness value selected through feature set selection step using GA as a feature vector for face authentication of each user, thereby forming and registering a SVM.

In accordance with another preferred embodiment of one aspect of the present invention, there is provided a method for face authentication by a face authentication system including an image input unit, face and eye region extraction unit, personal information input unit, control unit and SVM classifier, including the steps of: (a') inputting face image of a specific user upon receiving a request for face authentication by the user; (b') inputting personal information of the specific user registered in the authentication system upon receiving a request for face authentication; (c') reading selected readily distinguishable feature set, weights and support vectors for the user stored for face authentication matching the personal identification information of the user; (d') extracting the feature values from the inputted face image corresponding to the readily distinguishable feature set stored at training step; (e') using the support vectors and weights, thereby forming a SVM; and (f') using an input vector of the feature values extracted from the inputted face image, thereby performing face authentication using the SVM.

In accordance with still another preferred embodiment of one aspect of the present invention, there is provided a method for face authentication by a face authentication system including an ID (identification) card having a SVM, ID recognition unit, an image input unit, face and eye region extraction unit and control unit, including the steps of: (a'') inputting face image of a specific user when the system is requested for face authentication by the user; (b'') forming a SVM for face authentication using support vectors and weights stored in the ID card entered by the user requesting for face authentication; (c'') extracting feature values from the face image of the user corresponding to a set of readily distinguishable features stored in the ID card at a face training step; and (d'') using the extracted feature values as an input vector, thereby performing face authentication using the SVM.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
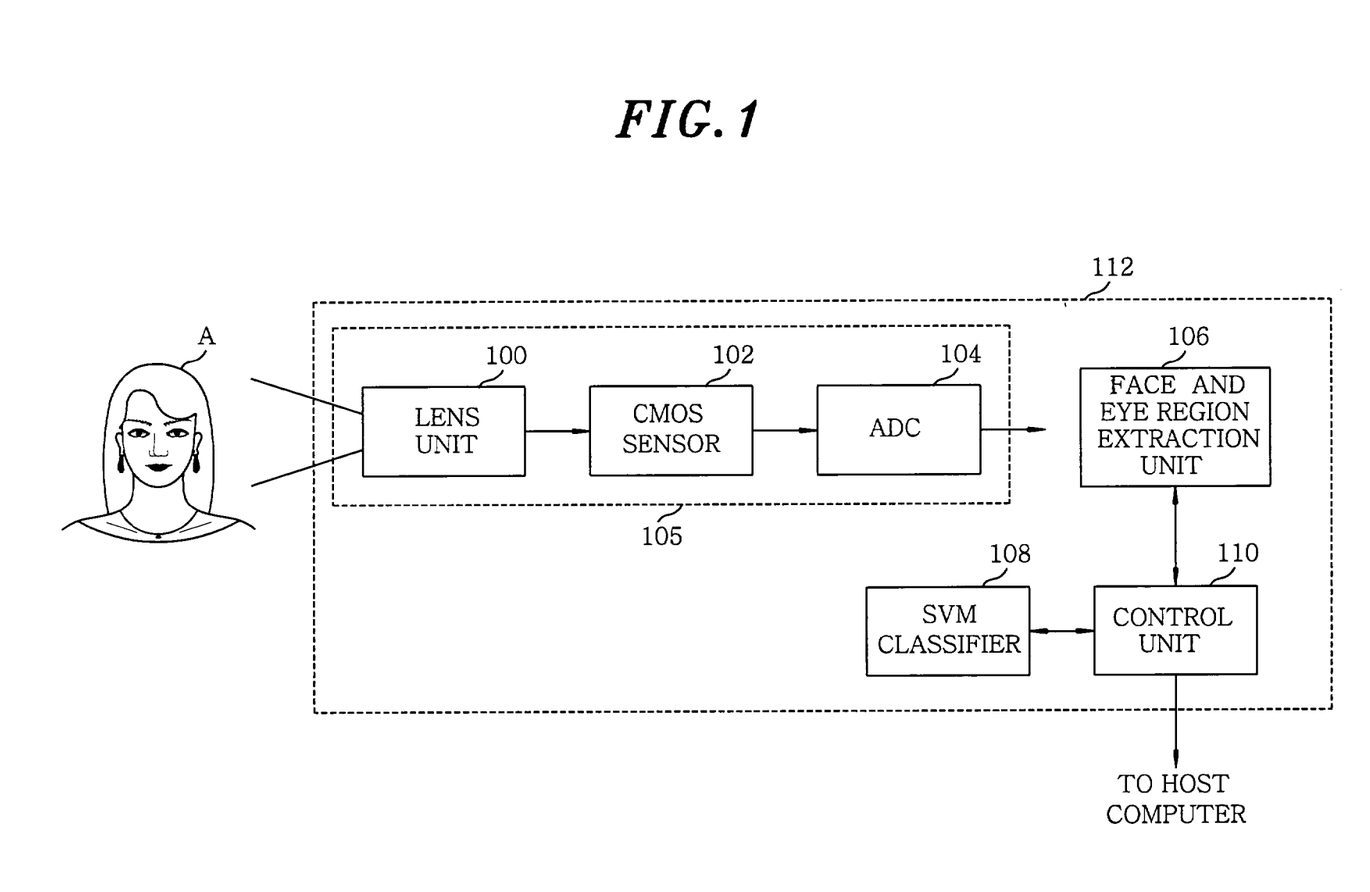
FIG. 1 is a view showing the construction of a face registration system using SVMs (Support Vector Machines) in accordance with an embodiment of the present invention.

FIG. 1 is a block diagram showing the construction of a face registration system 112, which includes an image input unit 105, a face and eye region extraction unit 106, a SVM classifier 108 and a control unit 110.

The image input unit 105 for identifying a face identification of the user who requests an identity authentication includes a lens unit 100, a CMOS sensor 102 and an analog-to-digital converter (ADC) 104. The lens unit 100 of the image input unit 105 takes a face image of a user as an optic signal and transfers the optic signal of the user's face image to the CMOS sensor 102. The CMOS sensor 102 transforms the optic signal passing through the lens unit 100 into an electric signal (a picturing image signal) and performs such functions of a camera as an exposure, gamma and gain adjustment, white balance and color matrix. The ADC 104 converts a field of the picturing image signal with a gain adjusted in the CMOS sensor 102 into a digital image signal and supplies the digital image signal to the face and eye region extraction unit 106.

The face and eye region extraction unit 106 detects a face region by using motion and color information of the digital image signal and analyzes a projection histogram of edge and binary information of the face region, to thereby extract an eye region. Since the distance and angle between eyes are used for a normalization of a size and angle thereof, the eye region needs to be extracted from the face region.

The control unit 110 performs the normalization and preprocessing of face images registered in the face registration system 112 to calculate values of features to be extracted from the face images and selects a set of features of chromosomes from each of the face images. Thereafter, the control unit 110 measures a fitness value of each of the chromosomes by the SVM classifier 108. At this time, the control unit 110 evolves the chromosomes in a way as a crossover, a mutation or etc. and seeks prominent chromosomes, which appropriately represent each face, among the evolved chromosomes by using a genetic algorithm (GA).

The control unit 110 builds the SVM classifier 108 by using the prominent chromosomes as input vectors. Thereafter, the control unit 110 extracts feature values from a face image of certain person requesting identity authentication and applies the extracted feature values to the SVM classifier 108, to thereby perform an identity authentication according to the result of the identity authentication, wherein the extracted feature values correspond to the selected set of features.

The SVM classifier 108 has a set of features of the sought prominent chromosomes as support vectors and stores the support vectors and weights therein. In case where a new face image is inputted to the SVM classifier 108, the SVM classifier 108 compares the new face image with the SV values, the weights and their combination by using information of the set of the prominent chromosomes provided from the control unit 110, to thereby determine and output whether or not the new face image is identical thereto.

Figure 2A:
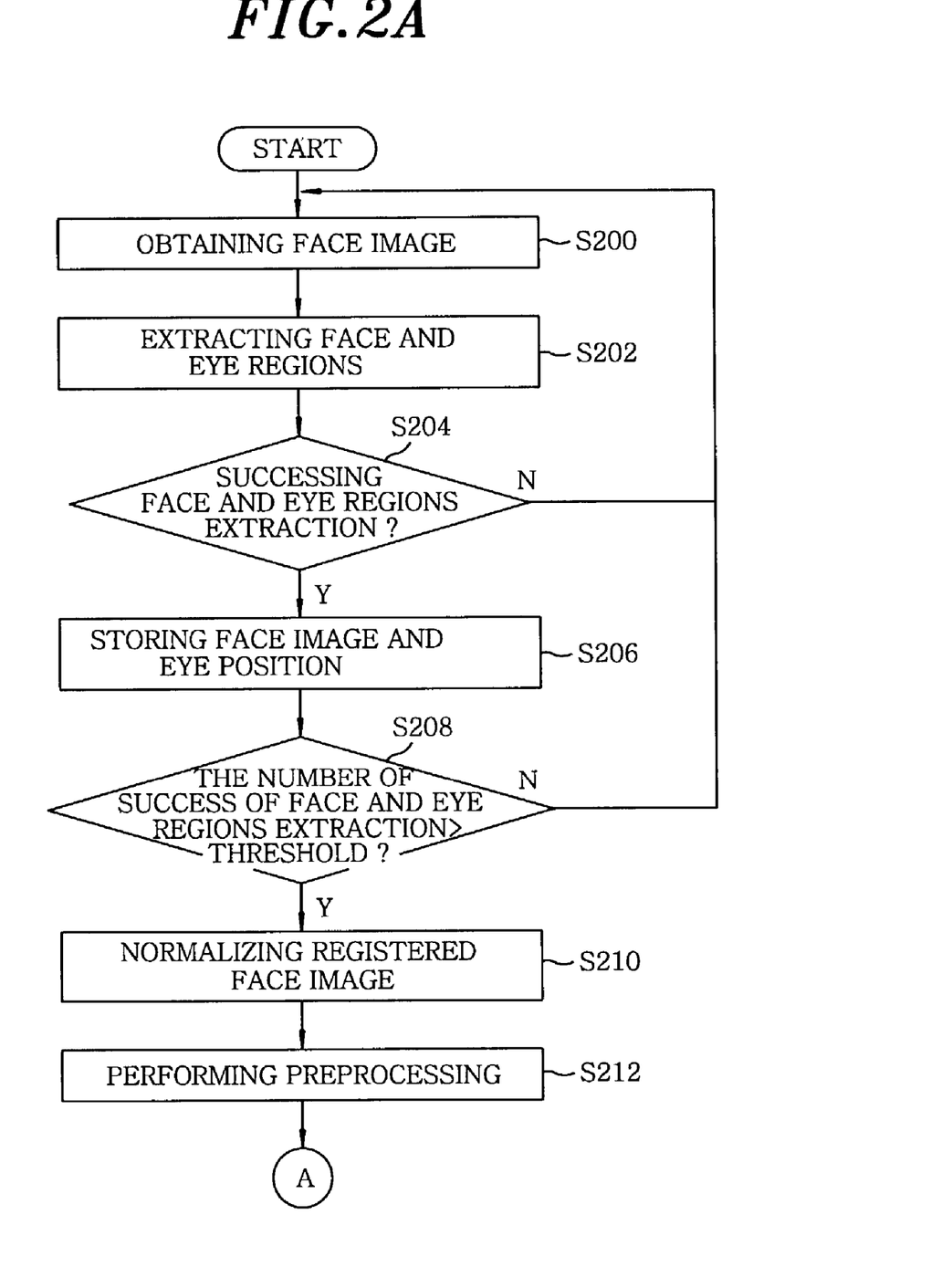
FIG. 2 is a flow chart illustrating a process of face registration using the SVM in accordance with the embodiment of the present invention.
Figure 2B:
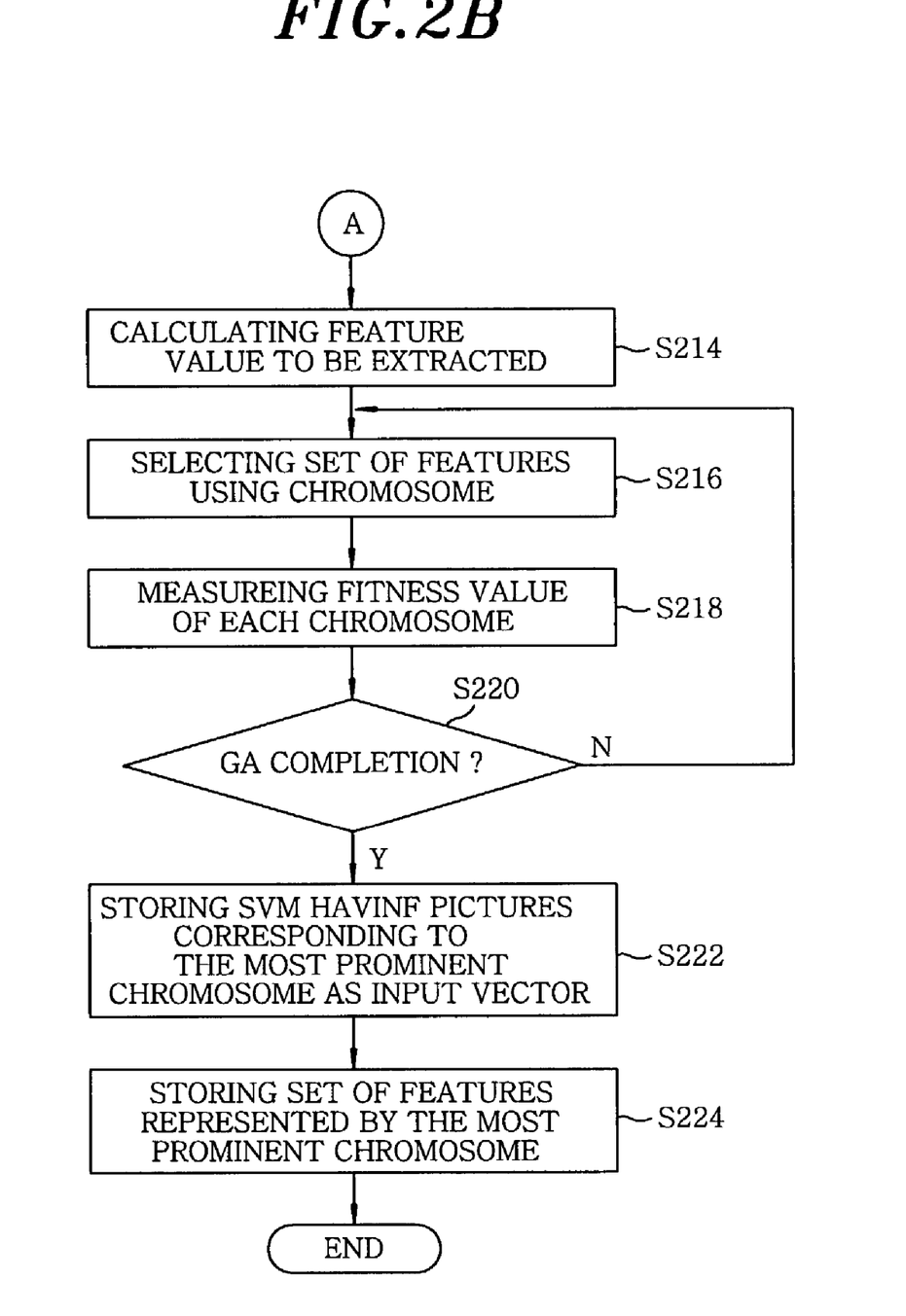

FIGS. 2A and 2B are flow charts of operational control of the face registration system including the SVM classifier 108 in accordance with the preferred embodiment of the present invention. Hereinafter, the operation control process of the present invention will now be described in detail with reference to FIGS. 1, 2A and 2B.

Referring to FIG. 2A, the image input unit 105 inputs face images of the users to be registered in the face registration system 112 under the control of the control unit 110 in order to calculate values of features from face images of each user at step S200. Then, the control unit 110 extracts face and eye regions from each face image inputted from the image input unit 105 at step S202.

Figure 3:
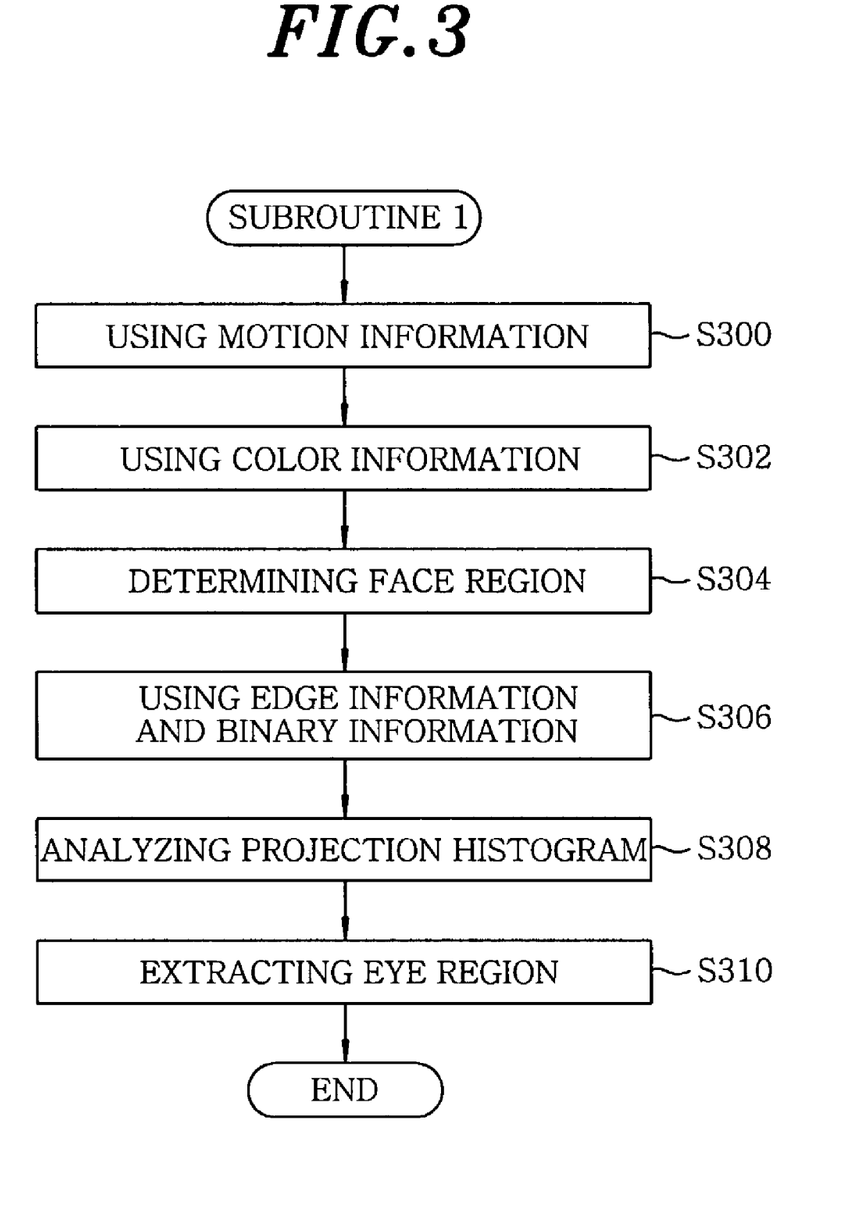
FIG. 3 is a flow chart illustrating a process of extracting face and eye regions in accordance with the embodiment of the present invention.

FIG. 3 is a flow chart illustrating a sub-routine process of procedure for extracting a face and eyes region. In case where a face image of a user is inputted to the control unit 110, the control unit 110 examines inter-frame motion information of the face image and color information of the face image at steps S300 and S302 and determines a region having large amount of inter-frame motion information of the face image and color information close to a skin color as the face region in the face image at step S304. Subsequently, the control unit 110 detects edge components and binary information of the face region determined at step S306 and analyzes a projection histogram of the face region using edge and binary information at step S308, thereby finally determining the eyes region in the face region at step S310.

Referring back to FIG. 2A, the control unit 110 extracts the face and eye regions from the face image inputted thereto as described with reference to the sub-routine 1 at step S202 and then proceeds to step S204 to examine whether the operation of the extraction of the face and eye regions is successfully performed because a different face image of another person instead of the face image of the user may be inputted thereto or the eye region may not be precisely extracted from the image data of the face region of the face image inputted thereto through the histogram analysis using the edge and the binary information at the sub-routine 1.

If the control unit 110 has not extracted the eye region from the image data of the region determined as the face region of the face image inputted thereto, the control unit 110 returns to step S200 to try to extract the eye region at steps S200 and S202. On the other hand, if the control unit 110 has successfully extracted the eye region via sub-routine 1 at step S202, the control unit 110 proceeds to step S206. At step S206, the control unit 110 registers the image inputted thereto as the face image and stores position information of the face and eye regions of the image inputted thereto in association with the registered image. The control unit 110 examines whether the number of the registered face images is as many as the predetermined number of reference images required for face authentication using a SVM. If the number of the registered face images is less than that of the reference images, the process returns to S200 and steps S200 to S208 are iteratively performed to register the face images.

On the other hand, if the number of the registered face images is as many as the number of the reference images, the control unit 110 proceeds to step S210 to normalize sizes of the registered face images by using the eye position information thereof, and performs preprocessing so that the face images have even luminosities through histogram equalizations at step S212.

Thereafter, at steps S214 to S224 of FIG. 2B, the control unit 110 selects readily distinguishable features of each user from feature information of the face region of each user through evolution process using GA, thereby calculating a unique SVM feature vector for each user. To this end, the control unit 110 classifies the registered face images of users and face images of others registered in the system into training data and tuning data, and then calculates values of a whole list of features for each of the training and tuning data ahead of time. Namely, the control unit 110 calculates and stores the whole feature values to be used to represent each chromosome of each of the face images of the users and others used as the training and tuning data from the normalized face images, in order to prevent the control unit 110 from redundantly calculating the values of a selected set of features using the GA at the next step.

At step S216 using the GA, the control unit 110 extracts feature values of each chromosome from the feature values of the face image of each user calculated previously, thereby building a SVM.

Figure 4:
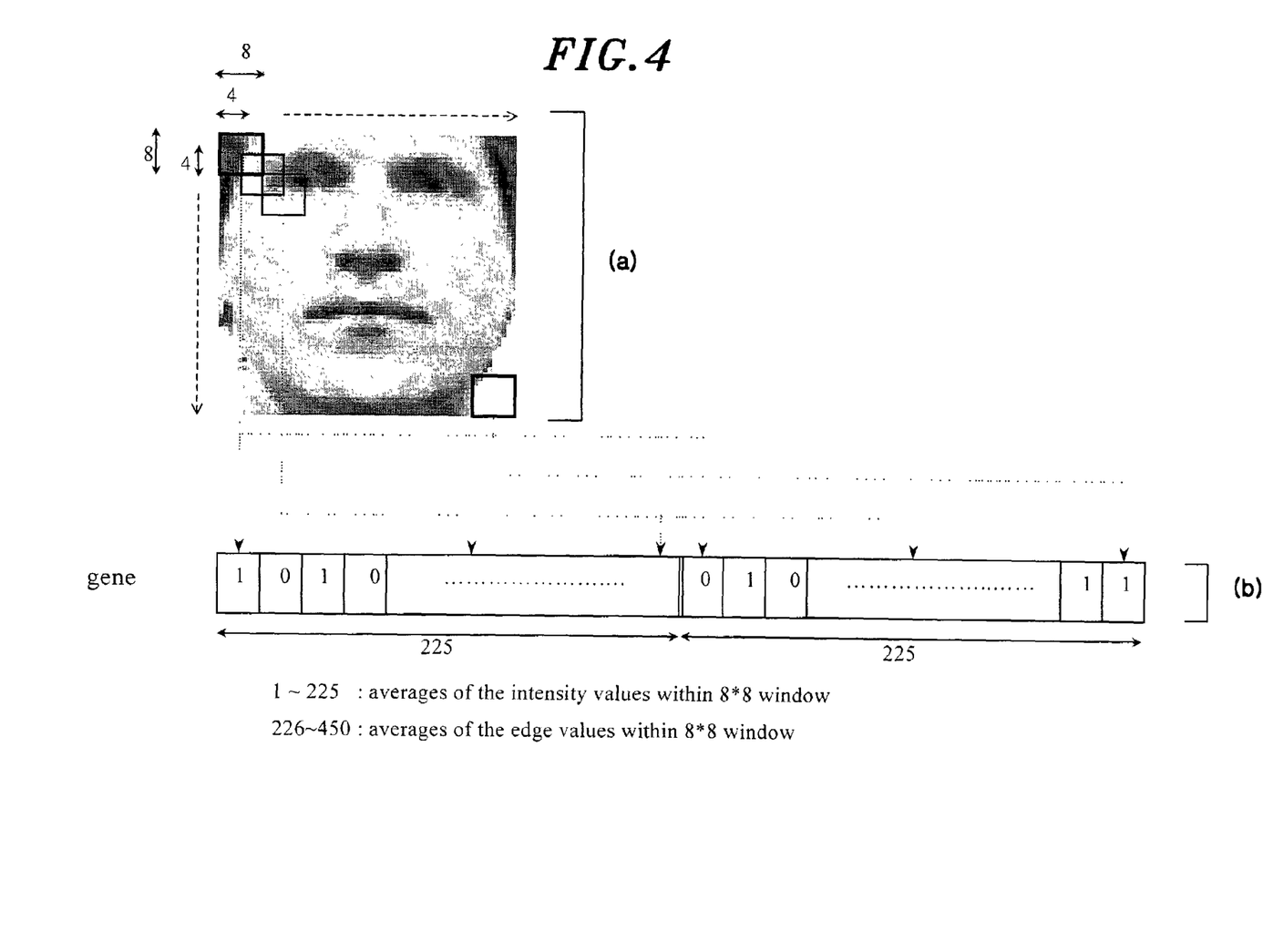
FIG. 4 is a view showing an example of extracting feature values of each chromosome from feature values of face image of each user in accordance with the embodiment of the present invention.

FIG. 4 is a view showing an example for extracting the feature values of each chromosome from the feature values of the face image of each user, wherein averages of the values and averages of the edge components within each 8×8 window of each normalized face image are selected as the feature values, thereby representing each chromosome with the feature values. Namely, when the normalized face image is a 64×64 image as shown in (a) of FIG. 4, values are selectively extracted from averages of pixels within each 8×8 window, wherein 8×8 windows are overlapped by 4-pixel units, and from averages of the edge components within each window using an edge operator, whereby each chromosome can be represented by (b) of FIG. 4 with the extracted values.

The averages of the pixels and edge components within each 8×8 window are used to extract the feature values therefrom, to represent each chromosome in the above description. However, this is given as an example of the present invention on for illustration purposes and the present invention may be applied in the same way to cases where entropy values of each window or other feature values capable of distinguishing the face image are used to represent each chromosome.

The control unit 110 proceeds to step S218 to measure fitness value of each chromosome representing the selected set of features and evolve each chromosome using the crossover and mutation until fitness value or generation number reaches a predetermined amount or number.

Figure 5:
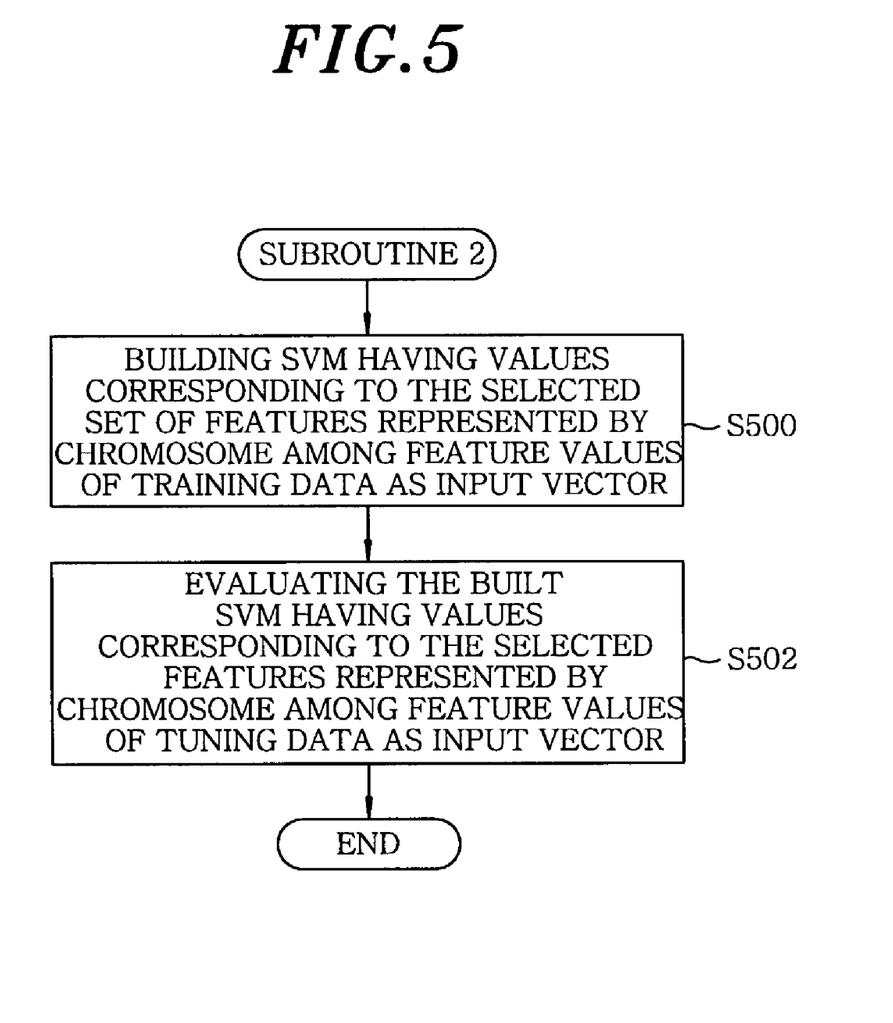
FIG. 5 is a flow chart illustrating a process of measuring fitness value of each chromosome in accordance with the embodiment of the present invention.

FIG. 5 is a flow chart illustrating a subroutine 2 for measuring fitness value of each chromosome by the control unit 110. Referring to FIG. 5, the control unit 110 extracts values from the feature values of the training data corresponding to the values of the selected set of features represented by each chromosome and uses the extracted values as an input vector to build a SVM at step S500. Then, the control unit 110 proceeds to step S502 to extract values from the feature values of the tuning data corresponding to the values of the selected set of features represented by each chromosome and input the extracted values to the SVM, thereby evaluating classification ability of the SVM using the number of successful identity authentications to use it to represent fitness value.

When it is determined at step S220 that fitness value of the chromosome measured at subroutine 2 exceeds the predetermined amount, or the evolution of the chromosome is proceeded to reach the predetermined generation number, the control unit 110 proceeds to step S222 to use an input vector of the values of the selected set of features of the chromosome with the highest fitness value to build a SVM for face authentication and store support vectors and weights in order to store the built SVM. Then, the control unit 110 stores the set of features represented by the chromosome with the highest fitness value at step S224, and then the registration process of the user's face ends.

Figure 6:
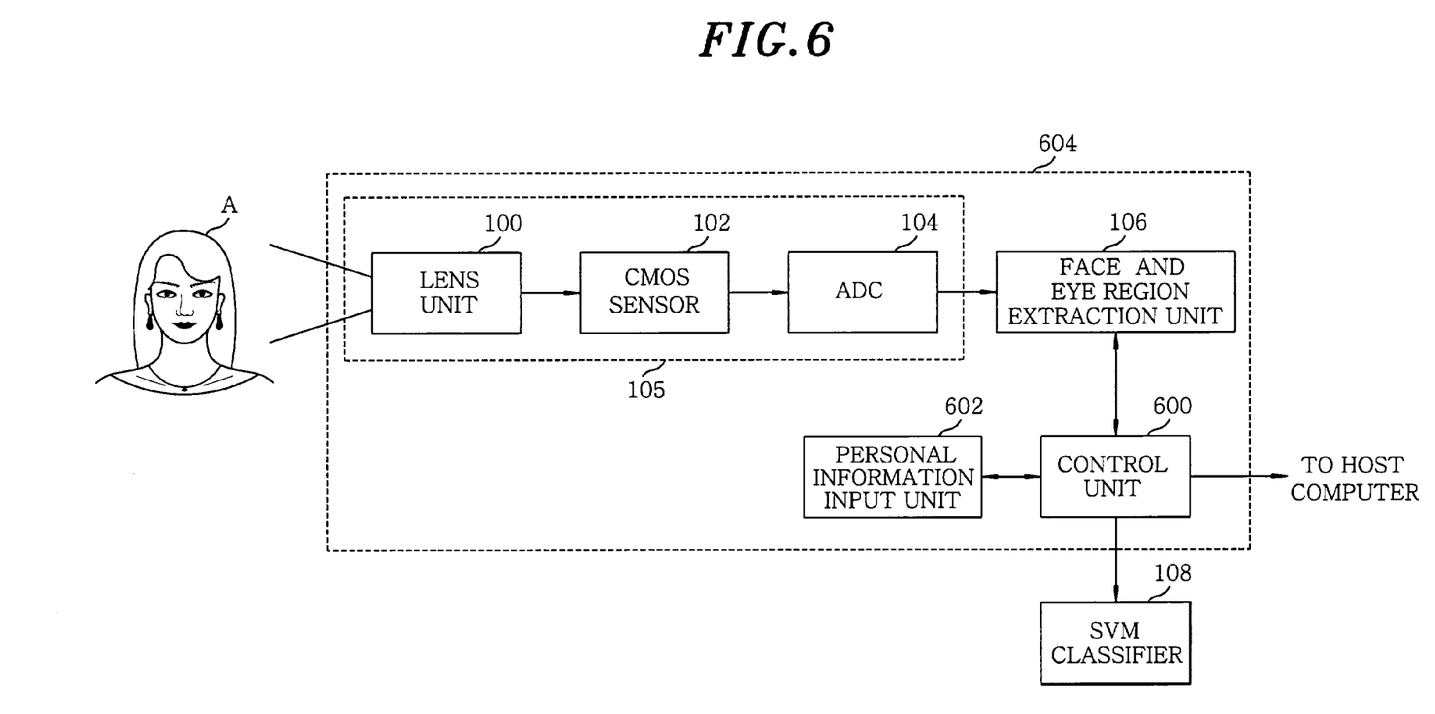
FIG. 6 is a block diagram showing a face authentication system using a SVM in accordance with another embodiment of the present invention.

FIG. 6 is a block diagram showing a face authentication system having a SVM classifier in accordance with another embodiment of the present invention. Referring to FIG. 6, the face authentication system includes an image input unit 105 for inputting a face image of a user, A, requesting the face authentication system to authenticate user's identity. Upon receiving a request for by the user, the image input unit 105 inputs the face image of the user and then transfers the face image to a face and eye region extraction unit 106. The image input unit 105 includes a lens unit 100, CMOS sensor 102 and ADC 104. Explaining the operation of the image input unit 105, the face image of the user is supplied to the CMOS sensor 102 through the lens unit 100. The CMOS sensor 102 transforms an optical signal of the face image of the user passed through the lens unit 100, into an electric signal (imaging signal) and performs functions of a camera such as an exposure, gamma and gain adjustment, white balance and color matrix. The ADC 104 transforms a field of the imaging signal, which is gain-adjusted by the CMOS sensor 102, into a digital signal, thereby applying the digital image data transformed thereby to the face and eye region extraction unit 106.

The face and eye extraction unit 106 detects a face region using motion and color information of the image data from the ADC 104 and then analyzes a projection histogram of edge and binary information of the face region, thereby extracting an eye region.

The face authentication system further includes a control unit 600, personal information input unit 602 and SVM classifier 108. When personal identification information, such as ID number, of the user requesting identity authentication is inputted to the personal information input unit 602, the control unit 600 reads support vectors, weights and a selected set of readily distinguishable features, previously stored corresponding to personal identification information for face authentication of the user among the users registered in the authentication system. The control unit 600 uses the support vectors and weights, and extracts feature values from the face image inputted thereto corresponding to the set of readily distinguishable features stored at the face training step to build a SVM classifier 108, wherein the control unit 600 uses an input vector of the extracted feature values to build the SVM, thereby performing face authentication using the SVM. The personal information input unit 602 may be an information input interface having a plurality of numeral keys for the user requesting face authentication to enter his/her personal identification information in numeral form, or be a USB security token input interface allocating key to each user. The personal information input unit 602 may be an identification recognition unit capable of recognizing an ID (identification) card widely used for identity authentication. When an ID card such as a smart card is used, which has restricted resources, the support vectors, weights and selected set of readily distinguishable features of the user are previously stored at the ID card to enable the system to perform face authentication using the ID card itself, thereby further improving security.

In the description of the embodiment of the present invention, the authentication system performs face authentication using the internal SVM classifier thereof, but the system may also perform face authentication under restricted environments, such as those with a limited memory and calculation capacity of the ID card.

Figure 7:
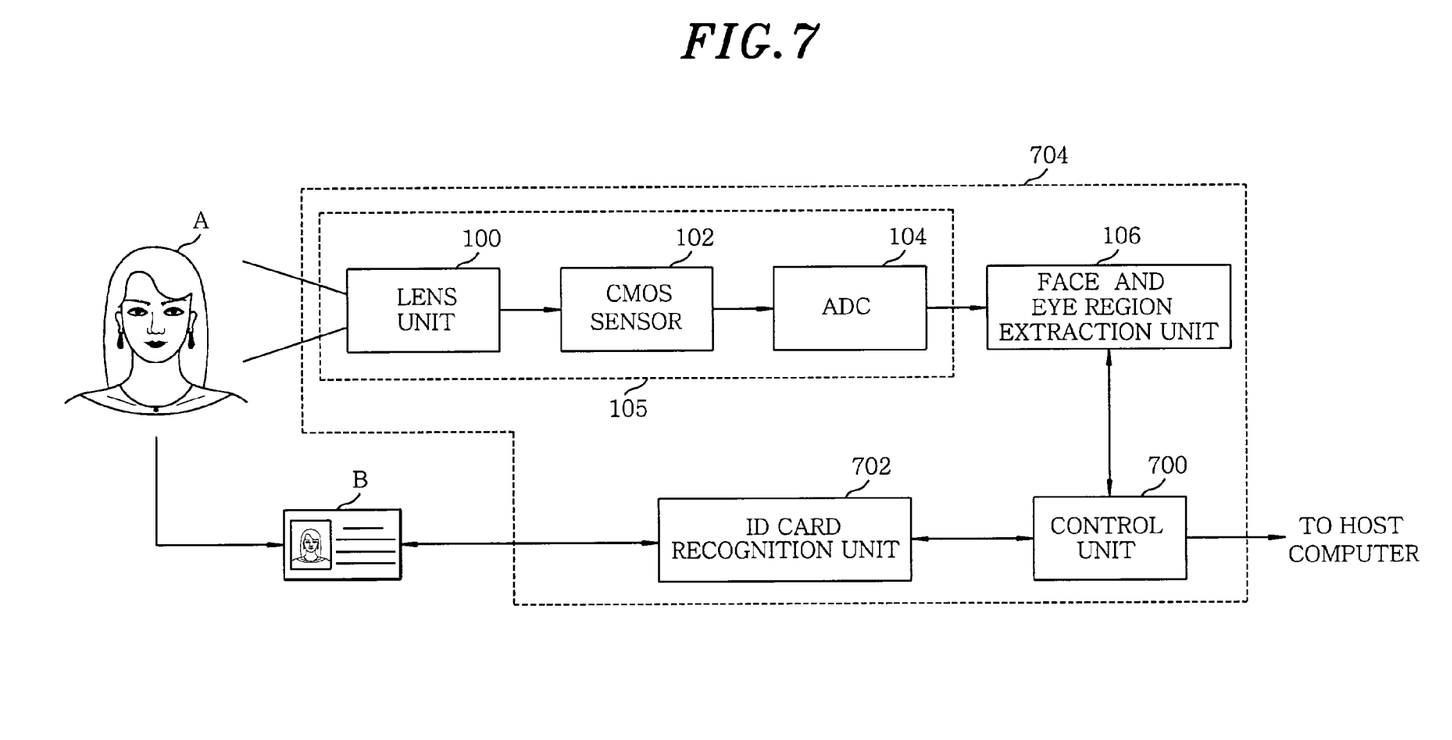
FIG. 7 is a block diagram showing a face authentication system under a restricted environment of an ID card internally having a SVM classifier in accordance with yet another embodiment of the present invention.

FIG. 7 is a block diagram showing a face authentication system under restricted environments of the ID card internally having a SVM classifier in accordance with yet another embodiment of the present invention. As shown in FIG. 7, the face authentication system includes a control unit 700 and ID card recognition unit 702 for functioning as the personal information input unit 602 of FIG. 6. When an ID card having a face image is inputted to the ID card recognition unit 702, the control unit 700 uses a selected set of readily distinguishable features of each user requesting identity authentication previously stored for face authentication to extract feature values from the face image in the ID card of a user requesting identity authentication corresponding to the selected set of readily distinguishable features stored at face training step, and then applies an input vector of the extracted feature values to the ID card through the ID card recognition unit 702. The ID card internally builds the SVM using the previously stored support vectors and weights of the user and performs face authentication for the feature values requesting face authentication, which are applied by the control unit 700, thereby performing face authentication using the built SVM. Then, the ID card notifies the control unit 700 of the result of authentication. This enables the face authentication system to operate using a SVM even under a restricted environment, such as an ID card having restricted resources, thereby further improving security.

Figure 8:
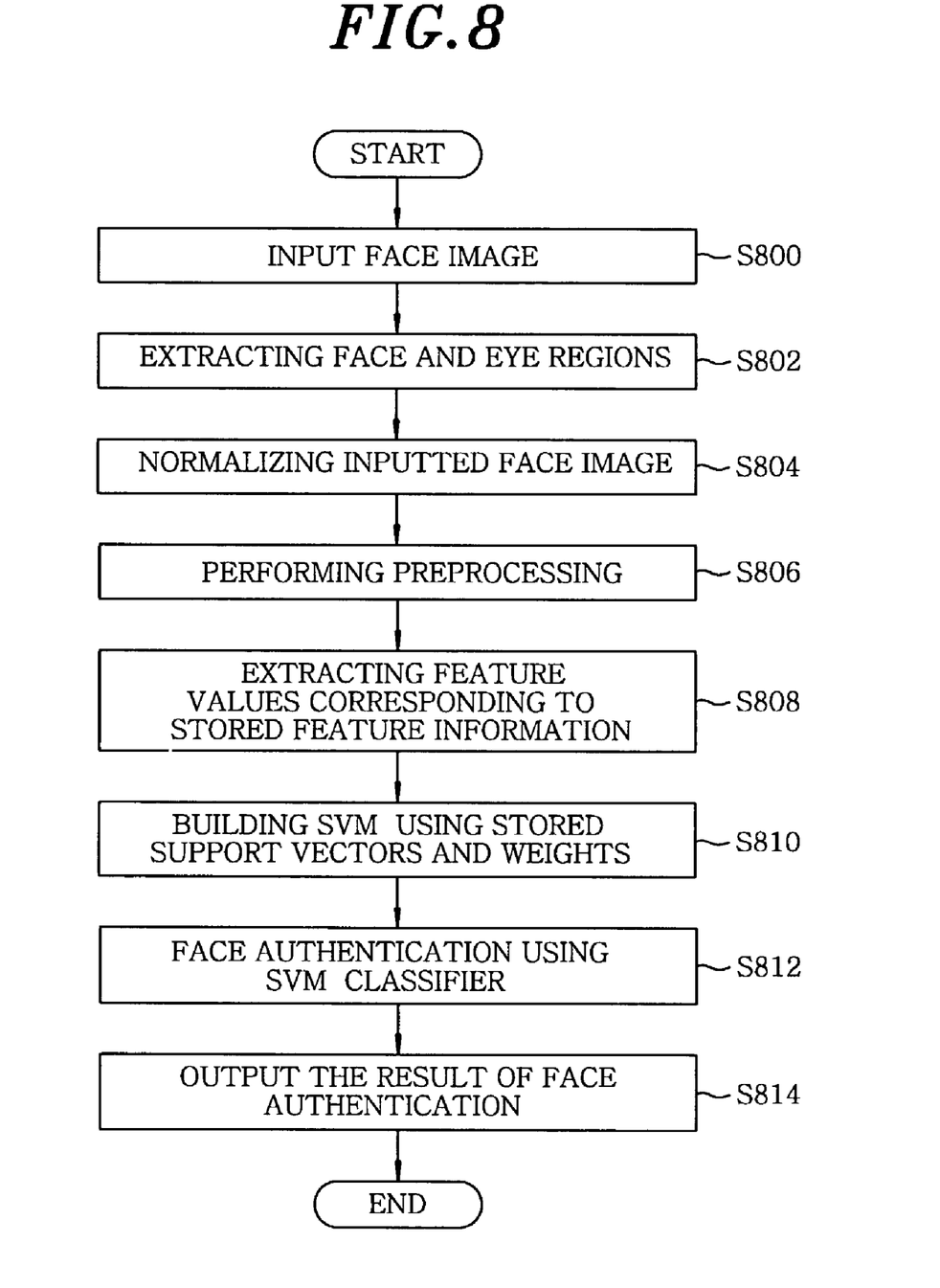
FIG. 8 is a flow chart illustrating a process of face authentication in accordance with the embodiments of the present invention.

FIG. 8 is a flow chart illustrating operations of face authentication in the face authentication system having a SVM classifier in accordance with the embodiment of the present invention. A detailed description of the embodiment of the present invention will be given hereinafter with reference to FIGS. 6 and 8.

Upon receiving a request for face authentication by an arbitrary user, the control unit 600 controls the image input unit 105 to input a face image of the user at step S800, and proceeds to step S802 to extract face and eye regions through histogram analysis using edge and binary information. The control unit 600 then normalizes the face image to be authenticated using positions of centers of the eyes at step S804 and preprocesses the normalized face image using histogram equalizations at step S806. When personal identification information is inputted to the personal information input unit 602, the control unit 700 reads support vectors, weights and a selected set of readily distinguishable features for each user previously stored corresponding to personal identification information for face authentication of the user among the users registered in the authentication system, thereby extracting the feature values from the face image inputted thereto corresponding to the set of readily distinguishable features values at step S808. Then, the control unit uses these support vectors and weights to build a SVM at step S810. The control unit 600 performs face authentication using the SVM with an input vector of the feature values extracted at step S808 at step S812, thereby displaying the result of authentication at step S814.

By selecting a set of readily distinguishable features for each user in accordance with the face registration and authentication steps of the present invention, resources are used effectively in the authentication process, whereby an authentication system achieving good performance can be implemented even under restricted environments.

As apparent from the above description, the present invention provides a system for face registration and authentication using a SVM. A set of readily distinguishable features for each user is selected at a registration step and only the set of features selected at the registration step is used at a face authentication step, whereby memory use according to unnecessary information and amount of data calculation for face authentication can be reduced. Thus, the present system has an advantage in that identity authentication through face authentication can be performed even under restricted environments of a USB token or smart card with limited resources. The present system further has advantages in that authentication performance is improved as readily distinguishable feature information is used, and the time for face authentication is reduced as face authentication is performed using the SVM built by using the optimal set of readily distinguishable features at a training step.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A face registration system for face authentication using a SVM comprising:
   an image input unit for inputting face images of users to be registered in the registration system;
   a face and eye region extraction unit for extracting face and eye regions from each face image inputted to the image input unit;
   a control unit for classifying the face images of users into training and tuning face images and forming a set of features representing chromosomes of each face image of training and tuning images; and
   a SVM classifier for iteratively measuring fitness value of the set of features of each chromosome of the training image using GA (Genetic Algorithms) to select the set of features most suitable to be a feature vector of a corresponding user requesting face authentication and extracting a feature vector from the face image of other users corresponding to the selected set of features, thereby comparing two vectors to determine a result of face authentications;
   wherein the eye regions are extracted from the face region through histogram analysis using edge components and binary information.

2. The face registration system as set forth in claim 1, wherein the SVM classifier establishes a set of features with improved fitness value by a chromosome evolution process of crossover and mutation according to GA, as an input vector, upon measuring fitness value of the set of features representing each chromosome.

3. The face registration system as set forth in claim 1, wherein the control unit previously calculates and stores the whole feature values for the training and tuning face images to be used at a training step for selecting the set of features.

4. The face registration system as set forth in claim 1, wherein the control unit normalizes each face image inputted thereto to a predetermined size using eye position information before the calculation of the set of features.

5. The face registration system as set forth in claim 1, wherein the feature values are averages of pixels within each window, the windows being overlapped in a predetermined size to scan each face image.

6. The face registration system as set forth in claim 1, wherein the feature values are averages of edge components of pixels within each window, the windows being overlapped in a predetermined size to scan each face image.

7. The face registration system as set forth in claim 1, wherein the feature values are entropy values of pixels within each window, the windows being overlapped in a predetermined size to scan each face image.

8. A face authentication system using a SVM comprising:
   an image input unit for inputting face images of users to be registered in the authentication system;
   a face and eye region extraction unit for extracting face and eye regions from each image inputted to the image input unit;
   a personal information input unit for inputting personal identification information of a specific user registered in the authentication system to perform face authentication upon receiving a request for identity authentication by the user;
   a control unit for reading support vectors, weights and a selected set of readily distinguishable features of the user previously stored, corresponding to personal identification information for face authentication of the user inputted to the personal information input unit, and extracting feature values from the face image inputted to the image input unit corresponding to the set of readily distinguishable features previously stored; and
   a SVM classifier for using the support vectors and weights to build the SVM and using an input vector of the feature values extracted from the face image, thereby performing face authentication using the SVM;
   wherein the eye regions are extracted from the face region through histogram analysis using edge components and binary information.

9. The face authentication system as set forth in claim 8, wherein the feature values are averages of pixels within each window, the windows being overlapped in a predetermined size to scan each face image.

10. The face authentication system as set forth in claim 8, wherein the feature values are averages of edge components of pixels within each window, the windows being overlapped in a predetermined size to scan each face image.

11. The face authentication system as set forth in claim 8, wherein the feature values are entropy values of pixels within each window, the windows being overlapped in a predetermined size to scan each face image.

12. A face authentication system using a SVM comprising:
   an image input unit for inputting face images of users to be registered in the authentication system;
   a face and eye region extraction unit for extracting face and eye regions from each image inputted to the image input unit;
   a smart card internally having a SVM classifier and to build the SVM using support vectors and weights previously stored for face authentication of the user and receive feature values extracted from a face image of a user requesting identity authentication as an input vector, thereby performing face authentication;

an identification recognition unit for interfacing transmitted/received data between the smart card and authentication system; and a control unit for inputting values of a set of readily distinguishable features of the user from the smart card, and extracting feature values from the face image of the user corresponding to the set of readily distinguishable features previously stored, thereby transferring an input vector of the extracted feature values to the smart card, thereby requesting face authentication;

wherein the eye regions are extracted from the face region through histogram analysis using edge components and binary information.

13. A method for face registration by a face registration system using a SVM, comprising the steps of:
  (a) inputting face images of users registered in the registration system;
  (b) extracting face and eye regions from each inputted image;
  (c) calculating feature values corresponding to whole sets of features to be used to select features from the inputted image; and
  (d) forming a set of features representing each chromosome of the face image and using the set of features having highest fitness value selected through feature set selection step using GA as a feature vector for face authentication of each user, thereby forming and registering a SVM;
  wherein the eye regions are extracted from the face region through histogram analysis using edge components and binary information.

14. The method as set forth in claim 13, wherein the step (b) includes the steps of:
  (b-1) extracting a face region using motion and color information through inter-frame difference of the face image; and
  (b-2) examining edge components and binary information of the image in the face region.

15. The method as set forth in claim 13, wherein the step (c) includes the steps of:
  (c-1) extracting eye position from the eye region;
  (c-2) normalizing the face image to a predetermined size using eye position; and
  (c-3) preprocessing the normalized face image and calculating feature values corresponding to whole sets of features to be used to select features from the face image.

16. The method as set forth in claim 15, wherein the preprocessing at step (c-3) is performed through histogram equalization of the face image.

17. The method as set forth in claim 13, wherein the step (d) includes the steps of:
  (d-1) measuring fitness value of the set of features representing each chromosome; and
  (d-2) establishing a set of features with improved fitness value by a chromosome evolution process using GA of crossover and mutation as an input vector of the SVM.

18. The method as set forth in claim 13, wherein the feature values are averages of pixels within each window, the windows being overlapped in predetermined sizes to scan each face image.

19. The method as set forth in claim 13, wherein the feature values are averages of edge components of pixels within each window, the windows being overlapped in predetermined sizes to scan each face image.

20. The method as set forth in claim 13, wherein the feature values are entropy values of pixels within each window, the windows being overlapped in predetermined sizes to scan each face image.

21. A method for face authentication by a face authentication system including an image input unit, face and eye region extraction unit, personal information input unit, control unit and SVM classifier, the method comprising the steps of:
  (a') inputting face image of a specific user upon receiving a request for face authentication by the user including extracting face and eye regions from the inputted face image, wherein the eye regions are extracted from the face region through histogram analysis using edge components and binary information;
  (b') inputting personal information of the specific user registered in the authentication system upon receiving a request for face authentication;
  (c') reading selected readily distinguishable feature set, weights and support vectors for the user stored for face authentication matching the personal identification information of the user;
  (d') extracting the feature values from the inputted face image corresponding to the readily distinguishable feature set stored at training step;
  (e') using the support vectors and weights, thereby forming a SVM; and
  (f') using an input vector of the feature values extracted from the inputted face image, thereby performing face authentication using the SVM.

22. The method as set forth in claim 21, wherein the step (a') further includes the steps of:
  (a'-1) normalizing the face image to a predetermined size using eye position; and
  (a'-2) preprocessing the normalized face image through histogram equalization, thereby inputting the face image.

23. The method as set forth in claim 21, wherein the method further comprises the step of:
  (g') displaying a result of face authentication to show the result of face authentication to the user.

24. A method for face authentication by a face authentication system including an ID (identification) card having a SVM, ID recognition unit, an image input unit, face and eye region extraction unit and control unit, the method comprising the steps of:
  (a") inputting face image of a specific user when the system is requested for face authentication by the user including extracting face and eye regions from the inputted face image, wherein the eye regions are extracted from the face region through histogram analysis using edge components and binary information;
  (b") forming a SVM for face authentication using support vectors and weights stored in the ID card entered by the user requesting for face authentication; and
  (c") extracting feature values from the face image of the user corresponding to a set of readily distinguishable features stored in the ID card at a face training step; and
  (d") using the extracted feature values as an input vector, thereby performing face authentication using the SVM.

* * * * *